(No Model.)
J. C. BALLEW.
BRAZING MACHINE.
No. 426,358. Patented Apr. 22, 1890.
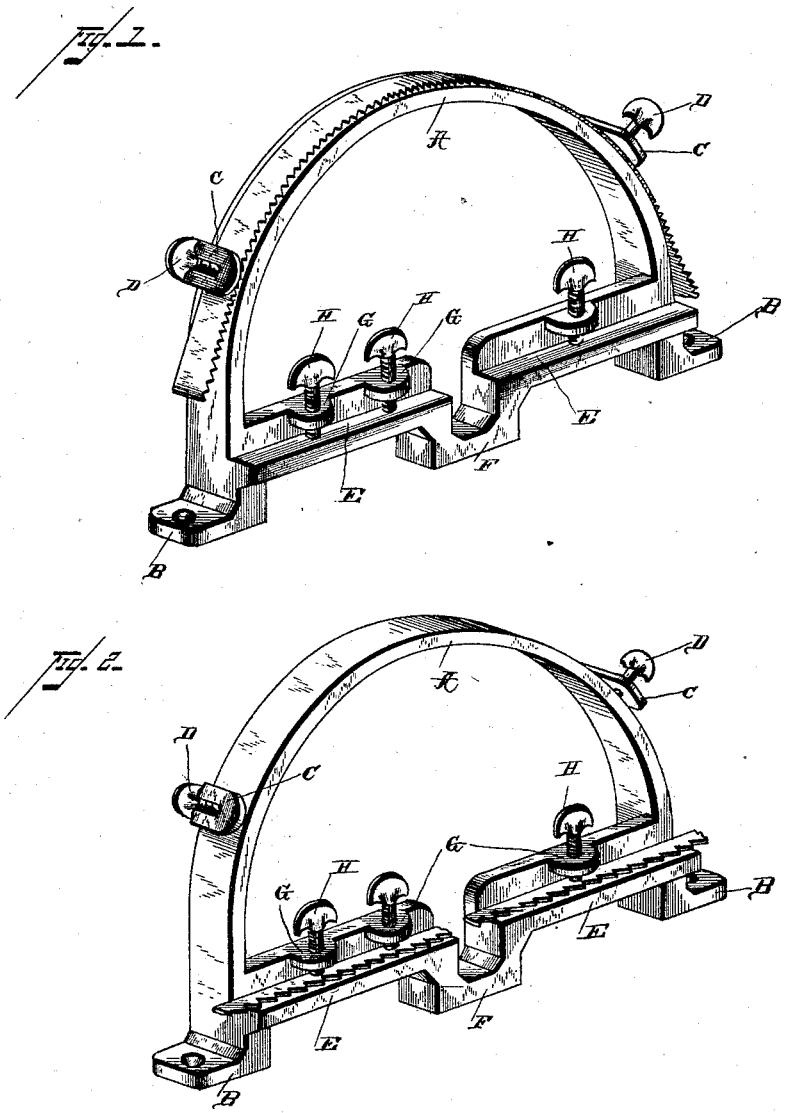

UNITED STATES PATENT OFFICE.

JOHN C. BALLEW, OF EVANSVILLE, INDIANA.

BRAZING-MACHINE.

SPECIFICATION forming part of Letters Patent No. 426,358, dated April 22, 1890.

Application filed November 27, 1889. Serial No. 331,737. (No model.)

*To all whom it may concern:*

Be it known that I, JOHN C. BALLEW, a citizen of the United States, and a resident of Evansville, in the county of Vanderburg and State of Indiana, have invented certain new and useful Improvements in Brazing-Machines; and I do hereby declare that the following is a full, clear, and exact description of the invention, which will enable others skilled in the art to which it appertains to make and use the same.

My invention relates to improvements in brazing devices, and has especial reference to a device particularly adapted for brazing band-saws and for filing or smoothing the brazed portions of the saw.

The leading object of the invention is the provision of a durable and inexpensive device adapted to be secured to a suitable base or bed, and which will enable the saw to be brazed in a thorough and perfect manner.

To attain the desired object, the invention consists of the peculiar and novel constructed brazing device herein illustrated, described, and specifically claimed.

Figure 1 represents a perspective view of a brazing device embodying my invention with the saw in position to be smoothed or filed, and Fig. 2 represents a similar view thereof with the saw in the position it is placed to be brazed.

The device consists of the segment or bow A, having at each end an ear B, for attaching the device to a suitable bed or base, and provided on each side with the angular lugs or projections C, in the horizontal limb of each of which is a clamping-screw D. This bow, as will be understood, has the saw encircle it after the same has been brazed, and the saw is securely retained by the clamping-screw while the operation of filing is being performed. The bow is connected at the lower portion thereof by an angle-bar E, having a depression at the center forming a recess F, and the horizontal limb of the angle-bar serves as a support for the saw while the same is being brazed, and the vertical limb thereof is provided with lugs G, in which are clamping-screws H, adapted to clamp the parts of the saw while they are being brazed, and the recess in the bar allows the same ends to be easily brazed.

It is thus evident that I provide a durable and cheap device, by means of which band-saws may be easily brazed and filed.

Having thus described my invention, I claim and desire to secure by Letters Patent of the United States—

1. The herein-described brazing device, consisting of the segment or bow provided on its upper surface with a series of clamps, the angle-bar connecting the ends of the same, and the clamps on the angle-bar, substantially as set forth.

2. The herein-described brazing device, consisting of a bow provided on its upper surface with a series of clamps, the angle-bar connecting the ends of the segment or bow and having a central depression or recess, and a clamping device on the angle-bar, substantially as set forth.

3. The herein-described brazing device, consisting of the segment or bow, the angular clamping lugs or projections upon the upper surface of said bow, clamping-screws passing through the horizontal members of said angular lugs or projections, the angle-iron connecting the lower ends of the segment or bow, provided with a central recess or depression, and having its vertical member provided with a series of forwardly-extending lugs, the vertical clamping-screws passing through said lugs, and the laterally-extending securing-lugs, substantially as set forth.

In testimony that I claim the foregoing as my own I have hereunto affixed my signature in presence of two witnesses.

JOHN C. BALLEW.

Witnesses:
WM. WENDT,
L. W. DEUSNER.